United States Patent [19]

Ham et al.

[11] Patent Number: 5,120,516

[45] Date of Patent: Jun. 9, 1992

[54] PROCESS FOR REMOVING $NO_x$ EMISSIONS FROM COMBUSTION EFFLUENTS

[75] Inventors: David O. Ham, Lexington, Mass.; Gary A. Moniz, Windham, N.H.; Melanie J. Gouveia, North Reading, Mass.

[73] Assignee: Physical Sciences, Inc., Andover, Mass.

[21] Appl. No.: 461,923

[22] Filed: Jan. 8, 1990

[51] Int. Cl.⁵ .................................................. C01B 21/00
[52] U.S. Cl. ...................................................... 429/235
[58] Field of Search ............... 423/235, 235 D, 239 A

[56] References Cited

U.S. PATENT DOCUMENTS

| | | | |
|---|---|---|---|
| 3,873,673 | 3/1975 | Teague et al. | 423/243 |
| 3,900,554 | 8/1975 | Lyon | 423/235 |
| 3,904,735 | 9/1975 | Atwood et al. | 423/243 |
| 3,961,018 | 6/1976 | Williamson | 423/235 |
| 3,984,529 | 10/1976 | Tung | 423/575 |
| 4,060,595 | 11/1977 | Eisenlohr et al. | 423/574 |
| 4,071,436 | 1/1978 | Blanton et al. | 208/120 |
| 4,081,509 | 3/1978 | Hishinuma et al. | 423/235 |
| 4,089,930 | 5/1978 | Herman et al. | 423/239 |
| 4,115,249 | 9/1978 | Blanton et al. | 208/120 |
| 4,115,250 | 9/1978 | Flanders et al. | 208/120 |
| 4,115,251 | 9/1978 | Flanders et al. | 208/120 |
| 4,152,298 | 5/1979 | Blanton et al. | 252/455 |
| 4,204,944 | 5/1980 | Flanders et al. | 208/120 |
| 4,204,945 | 5/1980 | Flanders et al. | 208/120 |
| 4,213,944 | 7/1980 | Azuhata et al. | 423/235 |
| 4,246,234 | 3/1981 | Kittrell et al. | 422/171 |
| 4,251,485 | 2/1981 | Schauer et al. | 422/168 |
| 4,291,004 | 9/1981 | McCaffrey et al. | 423/242 |
| 4,292,285 | 9/1981 | Nakao et al. | 423/210 |
| 4,307,067 | 12/1981 | Tagawa et al. | 423/224 |
| 4,324,775 | 4/1982 | Tung et al. | 423/539 |
| 4,325,924 | 4/1982 | Arand et al. | 423/235 |
| 4,330,510 | 5/1982 | Schauer et al. | 423/210 |
| 4,331,639 | 5/1982 | Hass et al. | 423/235 |
| 4,332,672 | 6/1982 | Blanton et al. | 208/120 |
| 4,335,084 | 6/1982 | Brogan | 423/235 |
| 4,350,669 | 9/1982 | Ixumi et al. | 423/235 |
| 4,351,811 | 9/1982 | Matsuda et al. | 423/239 |
| 4,358,297 | 11/1982 | Eberly | 55/62 |
| 4,358,428 | 11/1982 | Fujita et al. | 423/239 |
| 4,386,058 | 5/1983 | Hass | 423/235 |
| 4,393,031 | 7/1983 | Henke | 423/239 |
| 4,400,363 | 8/1983 | Grochowski et al. | 423/239 |
| 4,416,748 | 11/1983 | Stevens | 204/157 |
| 4,423,017 | 12/1983 | Dean | 423/235 |
| 4,430,303 | 2/1984 | Linde | 422/170 |
| 4,434,147 | 2/1984 | Dimpfl et al. | 423/235 |
| 4,435,260 | 3/1984 | Koichi et al. | 204/164 |
| 4,469,662 | 9/1984 | Hamada et al. | 423/235 |
| 4,469,663 | 9/1984 | Crump et al. | 423/242 |
| 4,473,535 | 9/1984 | Kittrell et al. | 423/239 |
| 4,510,124 | 4/1985 | Sears et al. | 423/437 |
| 4,520,124 | 5/1985 | Abe et al. | 502/159 |
| 4,549,991 | 10/1985 | Disteldorf et al. | 260/453 |
| 4,589,978 | 5/1986 | Green et al. | 208/113 |
| 4,617,175 | 10/1986 | Tolpin et al. | 422/171 |
| 4,624,839 | 11/1986 | Wolcott et al. | 423/228 |
| 4,629,609 | 12/1986 | Fruhbaum | 423/239 |
| 4,663,135 | 5/1987 | Miller | 423/235 |
| 4,672,052 | 6/1987 | Wagener et al. | 502/439 |
| 4,718,361 | 1/1988 | Berry | 110/345 |
| 4,720,376 | 1/1988 | Laue et al. | 423/239 |

(List continued on next page.)

FOREIGN PATENT DOCUMENTS

| | | | |
|---|---|---|---|
| 3324668 | 1/1985 | Fed. Rep. of Germany | 423/235 |
| 51-76166 | 7/1976 | Japan | 423/235 |
| 51-110490 | 9/1976 | Japan | 423/235 |
| 52-29491 | 3/1977 | Japan | 423/235 |
| 52-38463 | 3/1977 | Japan | 423/235 |

*Primary Examiner*—Gregory A. Heller
*Attorney, Agent, or Firm*—Testa, Hurwitz & Thibeault

[57] ABSTRACT

A method for removing $NO_x$, particularly nitrogen oxide, emissions from the exhaust products of combustion processes is disclosed. An alkyl amine is added to the stream of exhaust products at relatively low temperatures in the range of 350°–650° C. The alkyl amine does not require a catalyst to react with the nitrogen oxides at these temperatures. Monomethyl amine ($CH_3NH_2$) is particularly useful.

6 Claims, 5 Drawing Sheets

U.S. PATENT DOCUMENTS

| | | | |
|---|---|---|---|
| 4,725,416 | 2/1988 | Kristof et al. | 423/239 |
| 4,726,935 | 2/1988 | Inatsune et al. | 422/171 |
| 4,731,231 | 3/1988 | Perry | 423/235 |
| 4,732,743 | 3/1988 | Schmidt et al. | 423/239 |
| 4,737,345 | 4/1988 | Henke | 422/109 |
| 4,743,436 | 5/1988 | Lyon | 423/235 |
| 4,744,967 | 5/1988 | Brand et al. | 423/239 |
| 4,748,012 | 5/1988 | Weber et al. | 423/239 |
| 4,751,054 | 6/1988 | Watanabe | 422/111 |
| 4,761,270 | 8/1988 | Turchan | 423/235 |
| 4,778,665 | 10/1988 | Krishnamurthy et al. | 423/239 |
| 4,781,902 | 11/1988 | Schoubye | 423/239 |

5,120,516

PROCESS FOR REMOVING NO$_x$ EMISSIONS FROM COMBUSTION EFFLUENTS

FIELD OF THE INVENTION

This invention relates to pollution control and more particularly to the removal of NO$_x$, particularly nitrogen oxide, emissions from the exhaust products of combustion processes.

BACKGROUND OF THE INVENTION

Nitrogen oxides, mainly NO and NO$_2$, commonly referred to as NO$_x$, are emitted from most combustion processes, such as automobile engines or fossil fuel power plants. Although the atmospheric chemistry of NO$_x$ species is complex and not well understood, many researchers believe that NO$_x$ species contribute to ecosystem damage and possibly human health problems through acid rain and tropospheric ozone formation. Additionally, NO$_x$ emissions and NO$_x$ abatement processes may be the primary source for the measured increase in ambient N$_2$O. N$_2$O contributes to global warming, or the greenhouse effect, as well as to stratospheric ozone depletion.

Relatively widespread and inexpensive approaches for controlling NO$_x$ emissions from combustion processes employ combustion modifications. However, combustion modifications, such as changes in operating conditions or low NO$_x$ burner designs, typically lead to NO$_x$ reductions of no more than 60%.

Post combustion, exhaust gas treatment processes are available which can achieve up to 90% NO$_x$ removal. Commercially available processes include selective catalytic reduction (SCR), the copper oxide system or Shell flue gas treatment (SFGT) process, and selective non-catalytic reduction (SNR). SNR with ammonia or urea operates in a relatively narrow range of high temperatures (850°–1150° C.). SFGT requires high levels of SO$_2$ in the flue gas to generate the copper catalyst. Neither of these processes is appropriate for treating low sulphur exhaust gases from sources such as incinerators. High temperature processing is difficult in utility plants since it requires additive addition and mixing in a region of very rapid cooling, limiting the time available in the narrow temperature window.

SCR processes involve reacting ammonia (NH$_3$) with NO$_x$ in a flue gas in the presence of a catalyst to form nitrogen (N$_2$) and water (H$_2$O) Without a catalyst ammonia does not react at temperatures below about 850° or 900° C. In particular, NO does not react with NH$_3$ at temperatures as low as approximately 400° C. without a catalyst. SCR processes are expensive because catalyst lifetimes are limited, leading to high costs for catalyst replacement. In addition, even with a catalyst, the minimum temperature of NH$_3$-based processes is limited by undesirable deposition of NH$_4$HSO$_3$ downstream.

SUMMARY OF THE INVENTION

The present invention provides a process for removing NO$_x$ in which an alkyl amine is added to the exhaust gas of a combustion process without a catalyst. In particular, monomethyl amine (CH$_3$NH$_2$), MMA, is added to a combustion effluent in the gas phase at temperatures as low as 350° C. and with no catalyst present where it reacts rapidly with NO. Over 90% of the NO is either reduced to N$_2$ or oxidized to NO$_2$. The remaining NO$_2$ may be readily removed in a wet scrubber. NO$_2$ can also be readily removed over a catalyst. Accordingly, in the present invention the catalyst required for removal of NO$_x$ is reduced or eliminated. In addition, the removal process may occur at temperatures lower than temperatures at which prior art processes occur and can thus be effected at more convenient locations in exhaust conduits. The molar ratio of MMA to NO may range from 0.2 to 2.0 or higher.

The flue gas NO$_x$ removal systems of the present invention may be added to open or internal combustion sources including oil, coal, or natural gas fueled systems.

DESCRIPTION OF THE DRAWINGS

The invention will be more fully understood from the following, solely exemplary, detailed description taken in conjunction with the accompanying drawings, in which.

DETAILED DESCRIPTION OF THE INVENTION

The present invention accomplishes the removal of nitrogen oxides, primarily NO and NO$_2$, commonly referred to as NO$_x$, from the exhaust products of a combustion process. In the present invention, an alkyl amine represented by one of the formulas

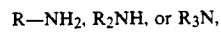

R—NH$_2$, R$_2$NH, or R$_3$N, where R is an alkyl group, is injected into a stream of exhaust gases at temperatures between 350°–750° C. Suitable alkyl amines have from one to five carbon atoms and a molecular weight of less than approximately 100. The alkyl amine reacts with the NO in the exhaust gases; some NO is reduced to N$_2$ and some oxidized to NO$_2$. The remaining NO$_2$ can be effectively removed by a scrubber or other device known in the art. Monomethyl amine, dimethyl amine, and trimethyl amine are particularly suitable alkyl amines. Monomethyl amine (CH$_3$NH$_2$), MMA, is preferred, since it reacts with NO at temperatures as low as 350° C.

Figure 1:
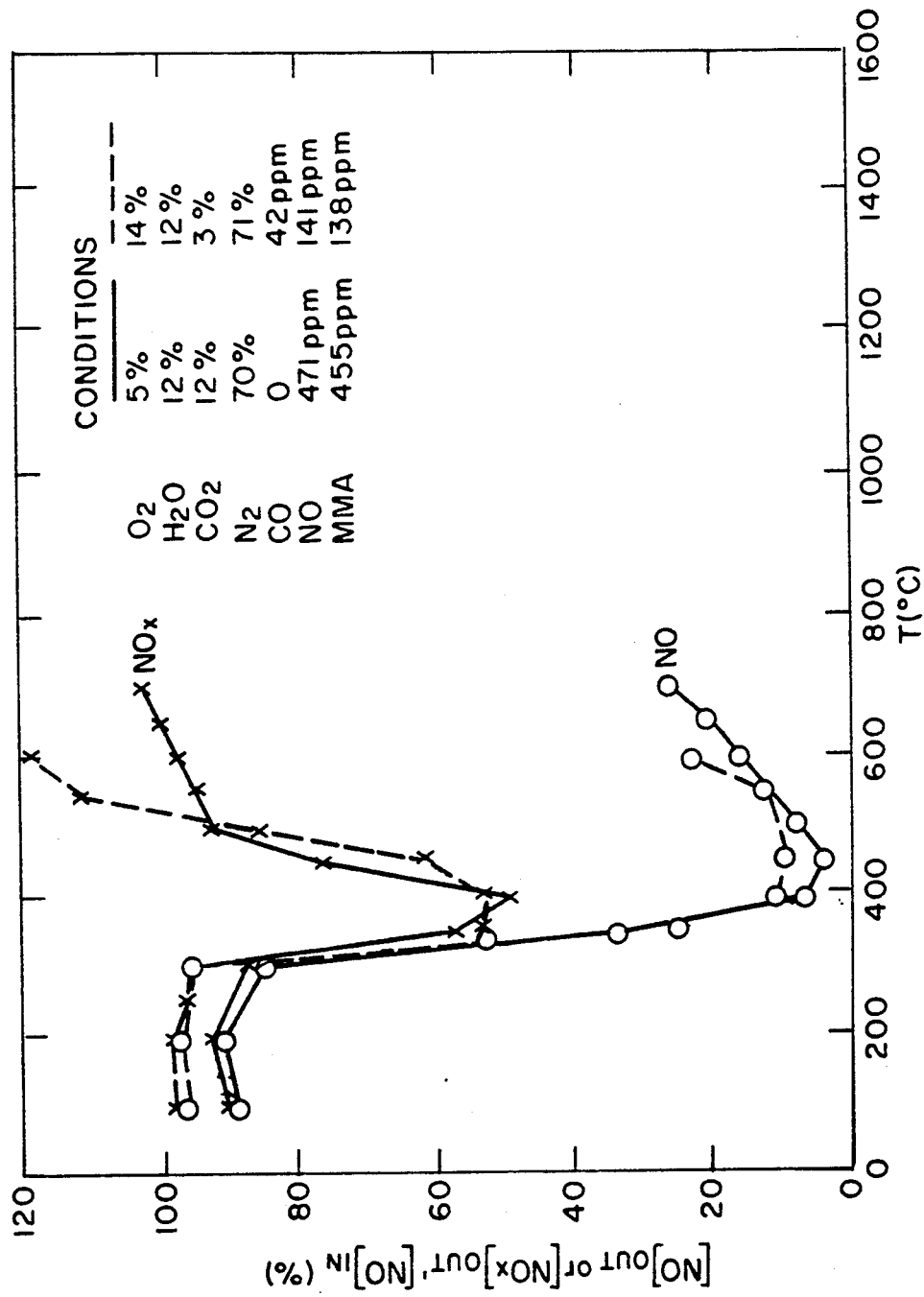
FIG. 1 is a graph showing the effectiveness of removal of NO$_x$ at various temperatures according to the present invention.

FIG. 1 shows experimental results for two exhaust gas conditions in which NO was removed by the addition of monomethyl amine (MMA) at a MMA:NO molar ratio of 1.0. Significant removal of NO occurred at temperatures as low as 350° C. This temperature is about 500° C. lower than temperatures required for gas phase NO$_x$ removal by ammonia, urea, cyanuric acid, or any other additive known in the prior art. At 450° C., more than 90% of the NO present reacted with the MMA; more than 50% was reduced to N$_2$ and about 40% oxidized to NO$_2$.

These results demonstrate that MMA removes greater than 90% of NO, leaving about 40% of the originally present NO$_x$ as NO$_2$ in a gas phase process at temperatures between 350° C. and 450° C. Since the remaining $NO_2$ can be effectively removed by a scrubber, greater than 90% removal of $NO_x$ can be achieved at temperatures significantly lower than any other known, non-catalytic process.

Figure 2:
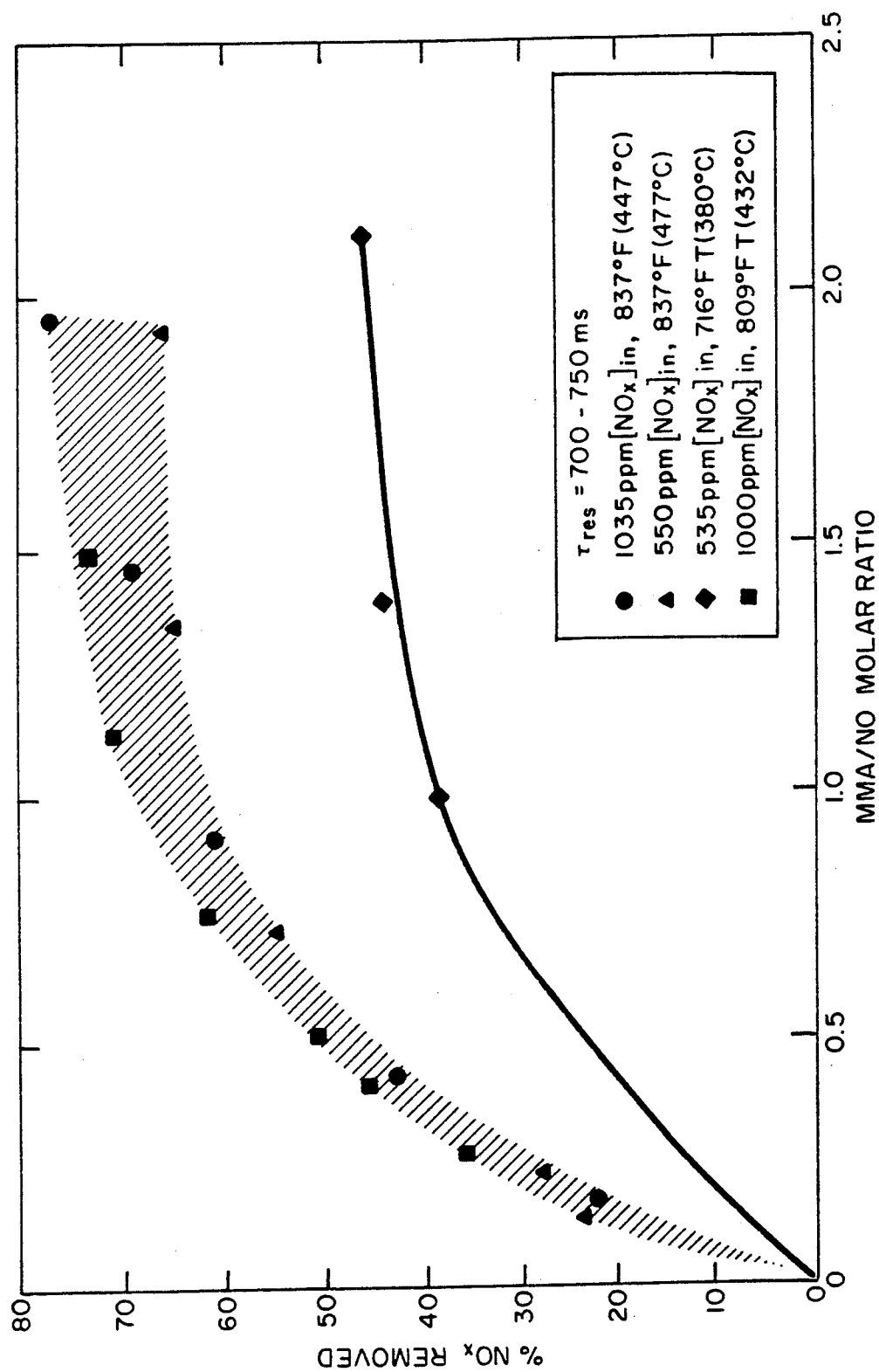
FIG. 2 is a graph showing the percentage of NO$_x$ removed at various additive to NO molar ratios.
Figure 3:
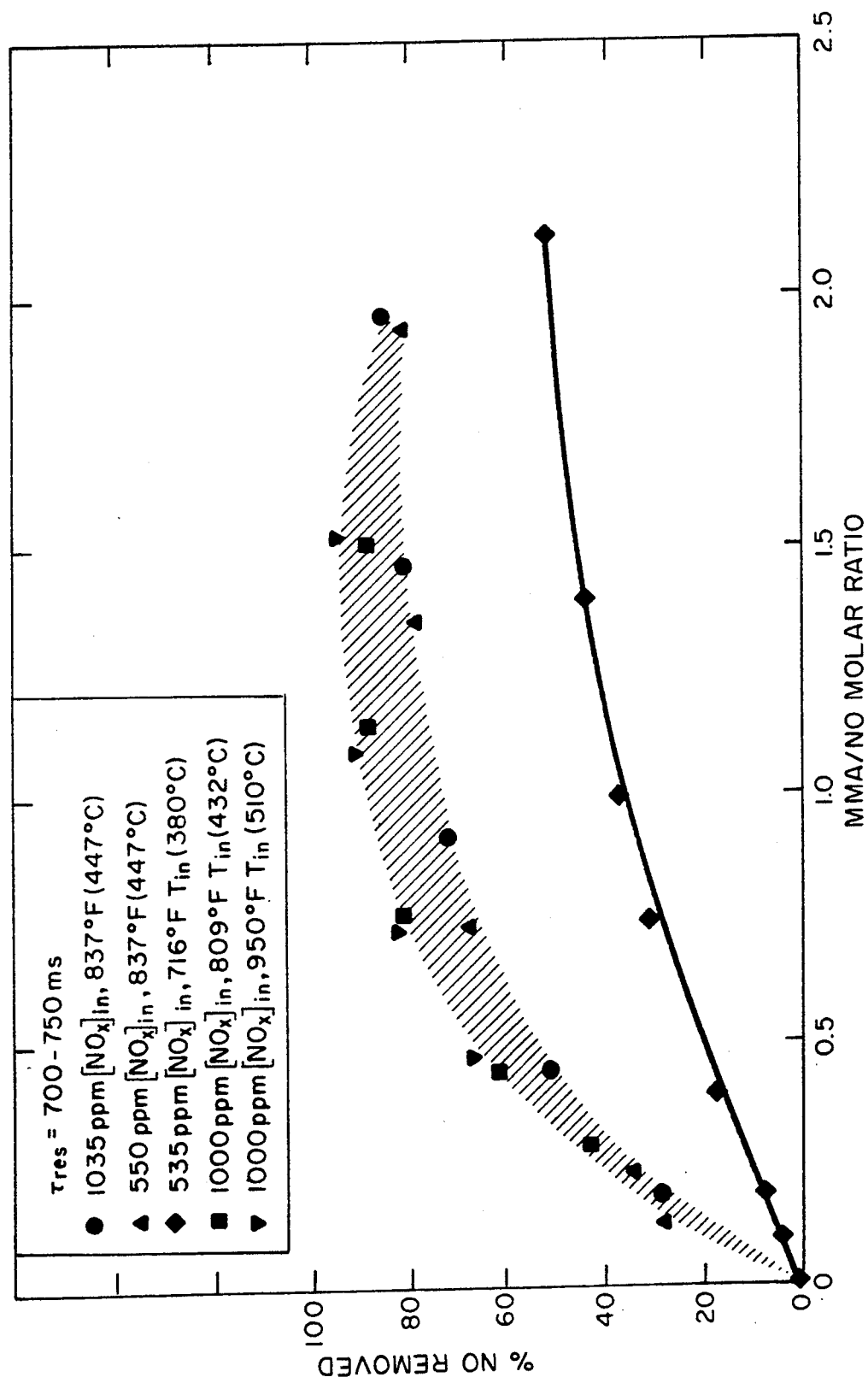
FIG. 3 is a graph showing the percentage of NO removed at various additive to NO molar ratios.

Further tests were conducted in a larger facility simulating larger exhaust gas flows. FIGS. 2 and 3 show the percentage of $NO_x$ and NO removed at several temperatures and molar ratios during these tests. At 430° C. and a molar ratio of 1.1, 70% of $NO_x$ was removed and 95% of NO was removed.

Figure 4:
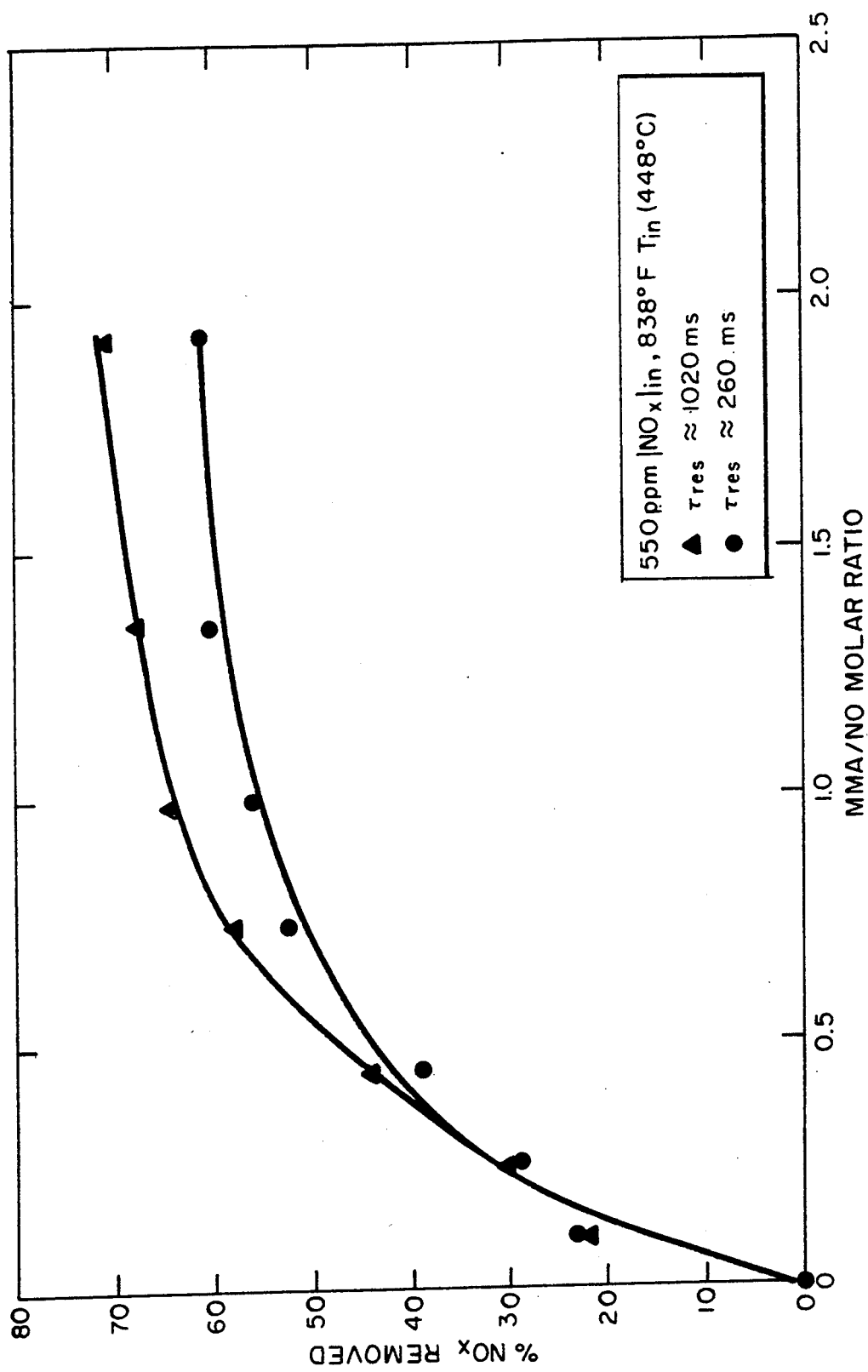
FIG. 4 is a graph showing the percentage of NO$_x$ removed at different additive residence times.

The MMA must be mixed into the gas flow rapidly to allow reaction in relatively short residence times. FIG. 4 illustrates that residence times as short as 260 ms are adequate for good $NO_x$ removal.

Reactions using dimethyl amine (DMA) were similar to the reactions using MMA. This indicates that using impure MMA which contains some DMA should also be satisfactory, resulting in a less expensive process.

Figure 5:
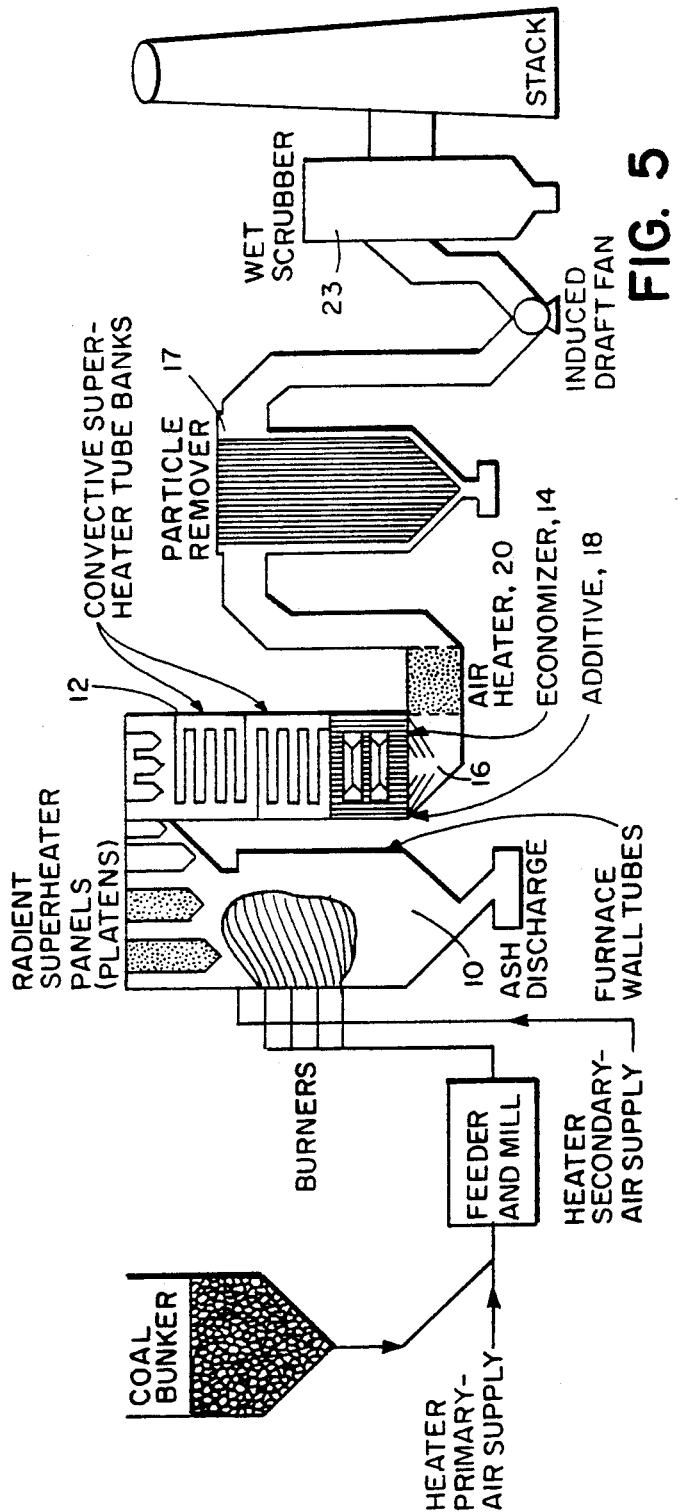
FIG. 5 is a schematic diagram of a power plant incorporating the present NO$_x$ removal process.

FIG. 5 shows a schematic diagram of an application of the present $NO_x$ removal process to the post combustion phase of a coal fired power plant. In a combustion unit 10, the fuel is burned to create heat which is used, for example, to make steam from water. The steam is used to generate mechanical energy.

The exhaust products from the burned fuel are initially at a high temperature of approximately 1050° F. and are in the gaseous state as they enter the post-combustion phase, shown at 12 in FIG. 1. An economizer 14 extracts the final useful heat from the gases by heat exchange with the gas flow. After passing through the economizer, the temperature of the exhaust products decreases to about 400° C. (750° F.), or lower, in a chamber 16. The $NO_x$ present in the gases is, typically, approximately 90% NO and 10% $NO_2$.

In chamber 16, an alkyl amine is added to the exhaust gases, using an injection nozzle or nozzles 18. Using MMA, approximately half of the NO reduces to $N_2$ and slightly less than half oxidizes to $NO_2$. After the reaction with MMA, the amount of NO has decreased to 4–5% relative to the original amount of $NO_x$ and $NO_2$ has increased to 30–40% relative to the original amount of $NO_x$. Total $NO_x$ has been decreased to about 40% of the original amount.

Next, the exhaust gases are typically passed through an air preheater 20 that preheats the air used in the combustion process of unit 10. The temperature of the exhaust gases decreases to about 150° C. (300° F.) after it is used to preheat the input air. Any solids that have formed may be removed through particle remover 17.

A wet scrubber 23 is typically incorporated into the ducting through which the gases pass from preheater 20 and particle remover 17. Lime in a water carrier is sprayed into the flow through a nozzle into the wet scrubber. Although NO cannot be washed out in the scrubber 23, $NO_2$ can be removed, along with $SO_2$. Since most of the $NO_x$ comprises $NO_2$ after reaction with MMA, the wet scrubber 23 results in greater than 90% $NO_x$ removal. Finally, the remaining gases pass to a stack 40 through which they are emitted to the atmosphere.

Figure 6:
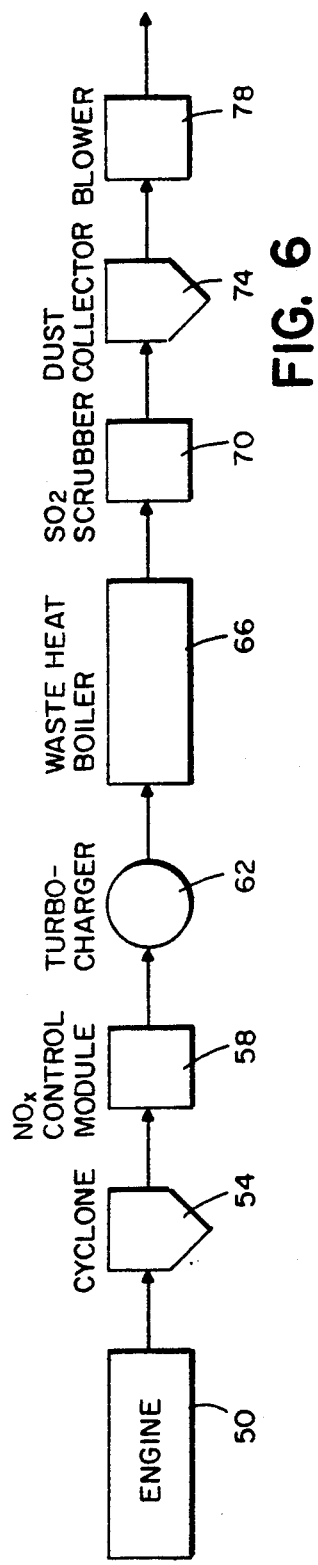
FIG. 6 is a schematic diagram of a cogeneration process incorporating the present NO$_x$ removal process.

FIG. 6 illustrates another application, a cogeneration process, for the $NO_x$ removal process of the present invention. Engine 50 may be a diesel engine, turbine, or any other heat engine. The exhaust gases from the engine are passed first to cyclone 54 for the removal of particulates. After leaving the cyclone, the gas temperature has been reduced to approximately 400° C. The gases then enter $NO_x$ control module 58 in which an alkyl amine is added to the gases to remove the $NO_x$.

If a diesel engine is used, the gases may be passed through turbocharger 62. Next, the gases enter waste heat boiler 66 for extracting the final useful heat from the gases typical of a cogeneration system. If coal fuel is used, the gases are passed to $SO_2$ scrubber 70. Additional $NO_2$ removal may occur here as well. The gases then enter dust collector 74 and finally are exhausted via blower 78 or other exhaust device.

The applications of the process of the present invention are not limited to power plants, incinerators, and cogeneration processes. The present $NO_x$ removal process may be used to reduce $NO_x$ emissions from any combustion process.

The invention is not to be limited by what has been particularly shown and described, except as indicated by the appended claims.

We claim:

1. A method of removing NO from a stream of combustion products comprising injecting an alkyl amine into the stream to effect reduction of NO to $N_2$, wherein the alkyl amine comprises methyl amine, and the process is conducted at a temperature within the range of 350° C. to 450° C. at a molar ratio to amine to NO within the range of about 0.2 to 2.0 without a NO reduction catalyst, said method being capable of at least about a 50% conversion of NO in said combustion products to $N_2$.

2. The method of claim 1 wherein said methyl amine contains dimethyl amine.

3. The method of claim 1 wherein said methyl amine contains trimethyl amine.

4. The method of claim 1 conducted at a temperature between about 400° C. and 450° C.

5. The method of claim 1 further comprising the step of passing the combustion products through a $NO_2$, removing apparatus.

6. The method of claim 5 characterized in that the process effects at least about a 90% decrease in NO and $NO_2$ in said combustion products.

* * * * *

UNITED STATES PATENT AND TRADEMARK OFFICE
CERTIFICATE OF CORRECTION

PATENT NO. : 5,120,516

DATED : June 9, 1992

INVENTOR(S) : David O. Ham, Gary A. Moniz, Melanie J. Gouveia

It is certified that error appears in the above-identified patent and that said Letters Patent is hereby corrected as shown below:

Col. 1, line 4, before "FIELD OF THE INVENTION" the following paragraph should be inserted:

---GOVERNMENT SUPPORT

This invention was made with government support under contract number F-08635-88-C-0261 from the U.S. Air Force. The government has certain rights in this invention.---

Signed and Sealed this

Eleventh Day of January, 1994

Attest:

BRUCE LEHMAN

Attesting Officer

Commissioner of Patents and Trademarks